US010061726B2

(12) United States Patent
McGowan et al.

(10) Patent No.: US 10,061,726 B2
(45) Date of Patent: Aug. 28, 2018

(54) PRECISION TIME MANAGEMENT (PTM) FOR USB RETIMERS THAT ACCURATELY ADJUSTS TIMESTAMP FIELDS OF ISOCHRONOUS TIMESTAMP PACKETS (ITPS)

(71) Applicant: Intel Corporation, Santa Clara, CA (US)

(72) Inventors: Steven B. McGowan, Portland, OR (US); Huimin Chen, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/757,939

(22) Filed: Dec. 23, 2015

(65) Prior Publication Data

US 2017/0185547 A1 Jun. 29, 2017

(51) Int. Cl.
| | | |
|---|---|---|
| G06F 13/00 | (2006.01) | |
| G06F 13/36 | (2006.01) | |
| G06F 13/40 | (2006.01) | |
| H04L 25/02 | (2006.01) | |

(52) U.S. Cl.
CPC .......... *G06F 13/36* (2013.01); *G06F 13/4027* (2013.01); *G06F 2213/0042* (2013.01); *H04L 25/0298* (2013.01)

(58) Field of Classification Search
CPC .............................. H04L 25/0298; G06F 13/36
See application file for complete search history.

(56) References Cited

U.S. PATENT DOCUMENTS

| | | | | |
|---|---|---|---|---|
| 6,647,210 | B1* | 11/2003 | Toyoda ................. | H04J 3/0682 398/100 |
| 7,672,417 | B2* | 3/2010 | Si .......................... | H03L 7/0814 375/354 |
| 8,144,531 | B2* | 3/2012 | Choi ....................... | G11C 7/22 365/194 |
| 2006/0064522 | A1 | 3/2006 | Weigold et al. | |
| 2008/0056426 | A1 | 3/2008 | Si et al. | |
| 2009/0285155 | A1* | 11/2009 | Scarpa ................ | H04L 27/0008 370/326 |
| 2011/0058433 | A1 | 3/2011 | Choi et al. | |
| 2012/0311359 | A1* | 12/2012 | Jaramillo ............. | H04L 25/0298 713/321 |
| 2017/0286359 | A1* | 10/2017 | McGowan .......... | G06F 13/4291 |

OTHER PUBLICATIONS

Hewlett-Packard Company et al., "Universal Serial Bus 3.1 Specification," revision 1.0, Jul. 26, 2013. Retrieved from <http://www.usb.org/developers/docs></Retrived>.

(Continued)

*Primary Examiner* — Tammara Peyton
(74) *Attorney, Agent, or Firm* — Womble Bond Dickinson (US) LLP

(57) ABSTRACT

A system and method of conducting precision time management in a universal serial bus system with a retimer. The method includes initiating, from the retimer, a link delay management request on an upstream-facing port of the retimer. The method further includes receiving, at a downstream-facing port of the retimer, a link delay management request and responding to the request received on the downstream-facing port.

18 Claims, 4 Drawing Sheets

(56) References Cited

OTHER PUBLICATIONS

Hewlett-Packard Company et al., "Universal Serial Bus 3.1 Appendix E," revision 1.0, Mar. 11, 2015. Retrived from <http://doc.xdevs.com/doc/Standards/USB 3.1/usb_31_030215>.

Notification of Transmittal of the International Search Report and the Written Opinion of the International Searching Authority issued for International Patent Application No. PCT/US2016/059932, dated Feb. 16, 2017.

* cited by examiner

PRECISION TIME MANAGEMENT (PTM) FOR USB RETIMERS THAT ACCURATELY ADJUSTS TIMESTAMP FIELDS OF ISOCHRONOUS TIMESTAMP PACKETS (ITPS)

BACKGROUND

Field

Embodiments of the invention relate to Universal Serial Bus systems. More specifically, embodiments of the invention relate to precision time management in Universal Serial Systems with retimers.

Background

Systems using Universal Serial Bus (USB) are ubiquitous in the modern computing environment. The most recent iteration of the USB follows The Universal Serial Bus 3.1 specification, published Jul. 26, 2013 (USB Spec 3.1) provides for precision time management (PTM), which enables USB devices to maintain a very accurate local clock that is synchronized to a platform master clock. To extend the range of USB, retimers have been defined that re-synchronize and re-drive packets on a link to enable longer trace lines on PCBs and longer cables. Unfortunately, existing retimers introduce highly variable delays in the packets passing through the retimer, rendering PTM unusable for devices in the path of a retimer.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1:
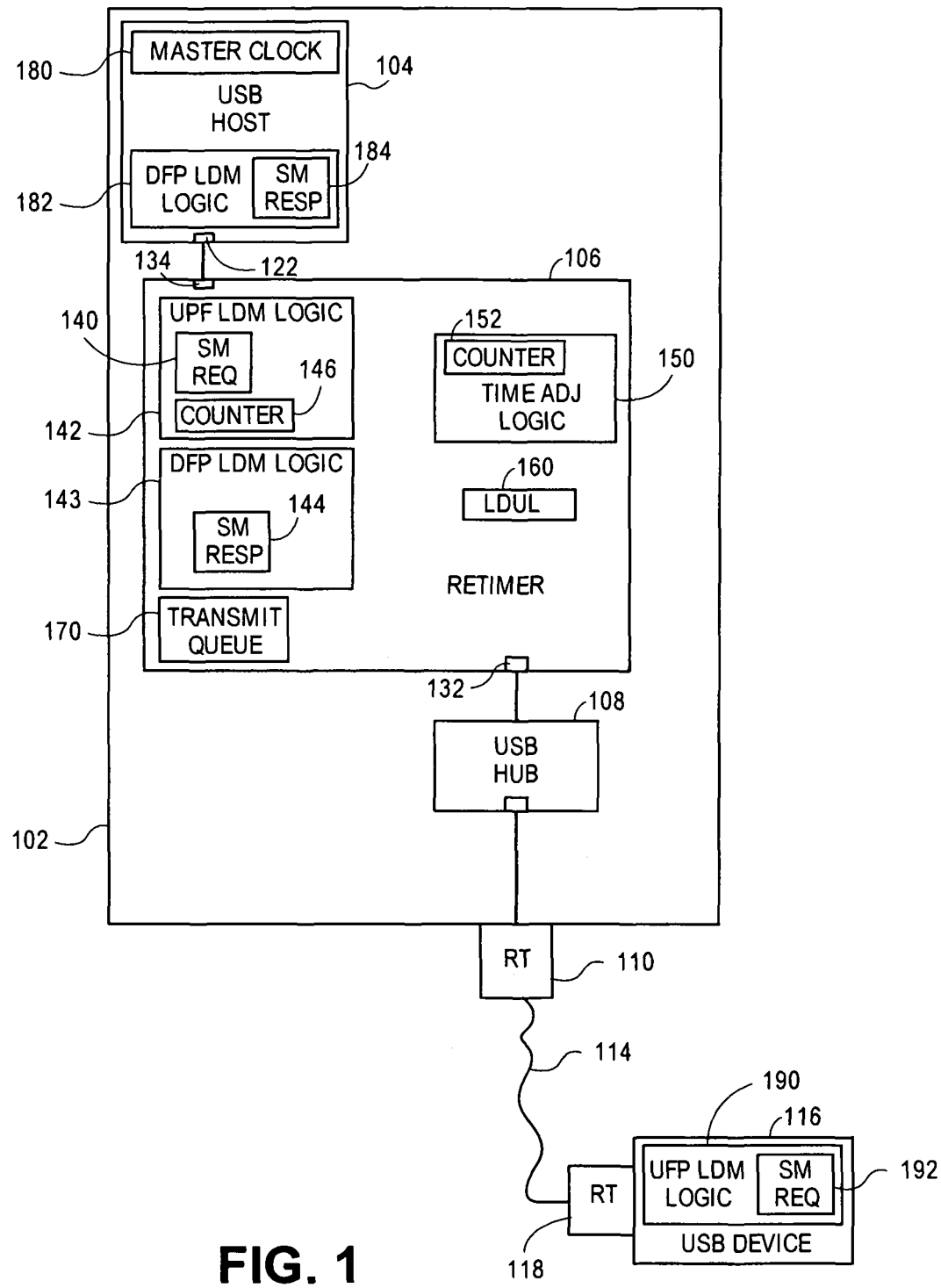
FIG. 1 is a block diagram of a system according to one embodiment of the invention.

FIG. 1 is a block diagram of a system according to one embodiment of the invention. A platform 102 has a Universal Serial Bus (USB) host 104 residing thereon. Host 104 maintains a master clock 180 and includes downstream facing port (DFP) link delay management (LDM) logic 182. Included in the DFP LDM logic 182 is a response state machine 184 that is responsible for responding to LDM requests received on the DFP 122 of the host 104.

The host 104 is connected through a retimer 106 to a hub 108 all residing on platform 102. Hub 108 is coupled through a retimer 110, which is instantiated in a cable 114 to USB device 114. For purposes of this application, all terms are used consistently with their meanings as set forth in USB Spec 3.1. USB device 114 may be a speaker, a microphone, a camera or any other USB device.

In embodiments of the invention, to permit, for example, USB device 116 to participate in precision time management (PTM), retimer 106 participates in link delay management (LDM) exchanges. An LDM exchange has three components: the upstream link delay, the downstream link delay, and the delay through the host's LDM request state machine 184. The delay in state machine 184 is reported to the retimer 106 in a received LDM response packet (received on upstream facing port (UFP)134).

Thus, retimer 106 sends link delay management requests on its UFP 134 (to be received by downstream-facing port 122 of the USB host 104). Retimer 106 must also respond to link delay management requests received on its downstream-facing port (DFP) 132 from USB hub 108.

To facilitate the LDM exchanges, retimer 106 includes UPF LDM logic 142, which includes a link delay requester state machine 140, and a link delay responder state machine 144. UPF LDM logic 142 also includes a counter 146 to determine if a timeout condition has occurred without receiving a response to the request. Generally, the retimer sends an LDM request packet on UFP port 134. Retimer 106 retains a copy of the transmit timestamp that can then be compared to the timing information received in response from host 104 to determine the link delay between the host and retimer 106 (the upstream link delay).

When the host 104 receives the LDM request, its DFP LDM logic 184 starts a delay timer and queues an LDM response packet to be transmitted on the DFP 122. When the LDM response packet is transmitted, the host 104 records the value of the delay timer in the LDM response packet to record the delay introduced between receiving the LDM request packet and transmitting the LDM response packet.

The retimer 106 LDM request state machine 140 records the time that it receives the LDM response packet in the receive timestamp. Then the retimer subtracts the transmit timestamp from the receive timestamp to determine how long the LDM exchange took. It then subtracts the delay through the host's LDM request state machine 184 to determine the round trip link delay. Finally the retimer 106 divides the round trip link delay by two to determine an accurate indication of the delay across the upstream link. The upstream link delay is then retained for later use. According to one embodiment, link delay 160 in the upstream link may be retained in a non-volatile storage unit.

To handle LDM requests received on its DFP 132, retimer 106 includes DFP LDM logic 143 with a LDM response state machine 144. When retimer 106 receives a LDM request on its downstream-facing port 132, the retimer 106 uses responder state machine 144 to respond to the request, providing timing information indicating the time between receipt of the request and transmission of the response out the downstream-facing port 132. This is analogous to the operation of the host response described above. The retimer's support for LDM exchanges on its upstream and downstream ports 134, 132, allow the retimer 106 to accurately determine the delay on the link with the host 104, and the hub 108 to accurately determine the delay on link between the hub 108 and retimer 106. Because the retimer 106 participates independently in the UFP and DFP LDM exchanges, the asymmetries and resulting link delay measurement errors that it would introduce between its upstream and downstream links absent its participation, are eliminated.

During normal operation, the retimer uses time adjustment logic 150 in conjunction with the previously-determined upstream link delay 160 to accurately adjust the timestamp fields of isochronous timestamp packets (ITPs) so that downstream USB entities can accurately discern the boundaries of microframes, thus permitting devices connected through the retimer(s) to use PTM consistent with USB Spec 3.1.

When an ITP is received on upstream-facing port 134, if the delayed bit is not set in the ITP, time adjustment logic 150 initiates the process of correcting the timestamp field in the ITP. Particularly, it resets an ITP delay counter 152 to zero. The ITP delay counter 152 is incremented by the PTM clock. The ITP is queued for transmission on downstream-facing port 132 on transmit queue 170. The queued packet timestamp information is modified in two respects. First, the value of the bus interval boundary$_{(RXITP)}$ is copied to the bus interval boundary$_{(TXITP)}$ subfield in the queued packet. Secondly, the time adjustment logic 252 calculates a delta timing value for the packet to be transmitted. In some embodiments, this calculation is given by Delta$_{TX}$=LDM Link Delay+Delta$_{(RXITP)}$+ITP Delay Counter−Correction$_{(RXITP)}$. In other embodiments, the delta value is calculated without evaluating the correction value within the retimer, but instead merely copying the received correction value present in the ITP received on the UFP. Notably, the Delta value for the time at which the packet will be transmitted, not the time at which the packet is initially queued. The Delta value is inserted into the Delta$_{(TXITP)}$ subfield if the ITP prior to transmission. The retimer 106 then calculates the cyclic redundancy check (CRC) values for the modified ITP.

Retimer 110 includes the same elements as 106 and performs the same link delay management exchanges and timing adjustments as described with references to retimer 106 above. Retimer 110 is instantiated in a USB cable connector for cable 114. For most cables of significant length, a second retimer 118 may be instantiated in a connector at the opposite end of the cable 114. Retimer 118 also includes the same element and performs the same link delay management exchanges and timing adjustments as described with references to retimer 106 above. That is; retimer 110 send LDM requests to hub 108 and responds to requests from retimer 118. Retimer 118 send requests to retimer 110 and responds to requests from USB device 116. USB device 116 includes UFP LDM logic 190 including a LDM requestor state machine to initiate the requests to retimer 118. While the depicted embodiment shows three retimers in the path between host 104 and device 116, more or fewer retimers may be use. Additional retimers can be introduced to improve signal quality as the signal quality drops due to path length or other factors. Each retimer in the path desirably performs the LDM exchanges and time adjustment as describe above.

Figure 2A:
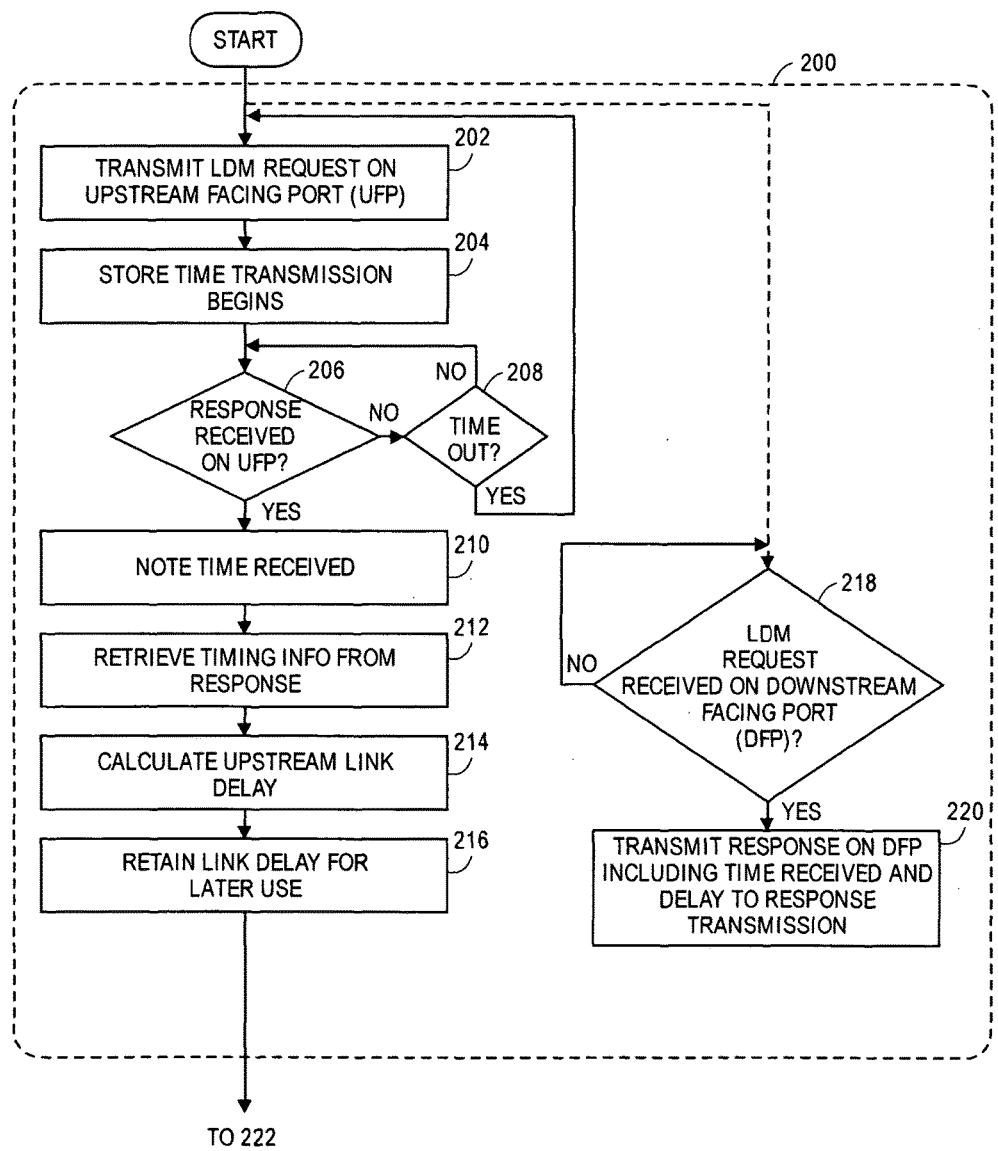
FIGS. 2A and 2B are a flowchart of operation in a retimer according to one embodiment of the invention.
Figure 2B:
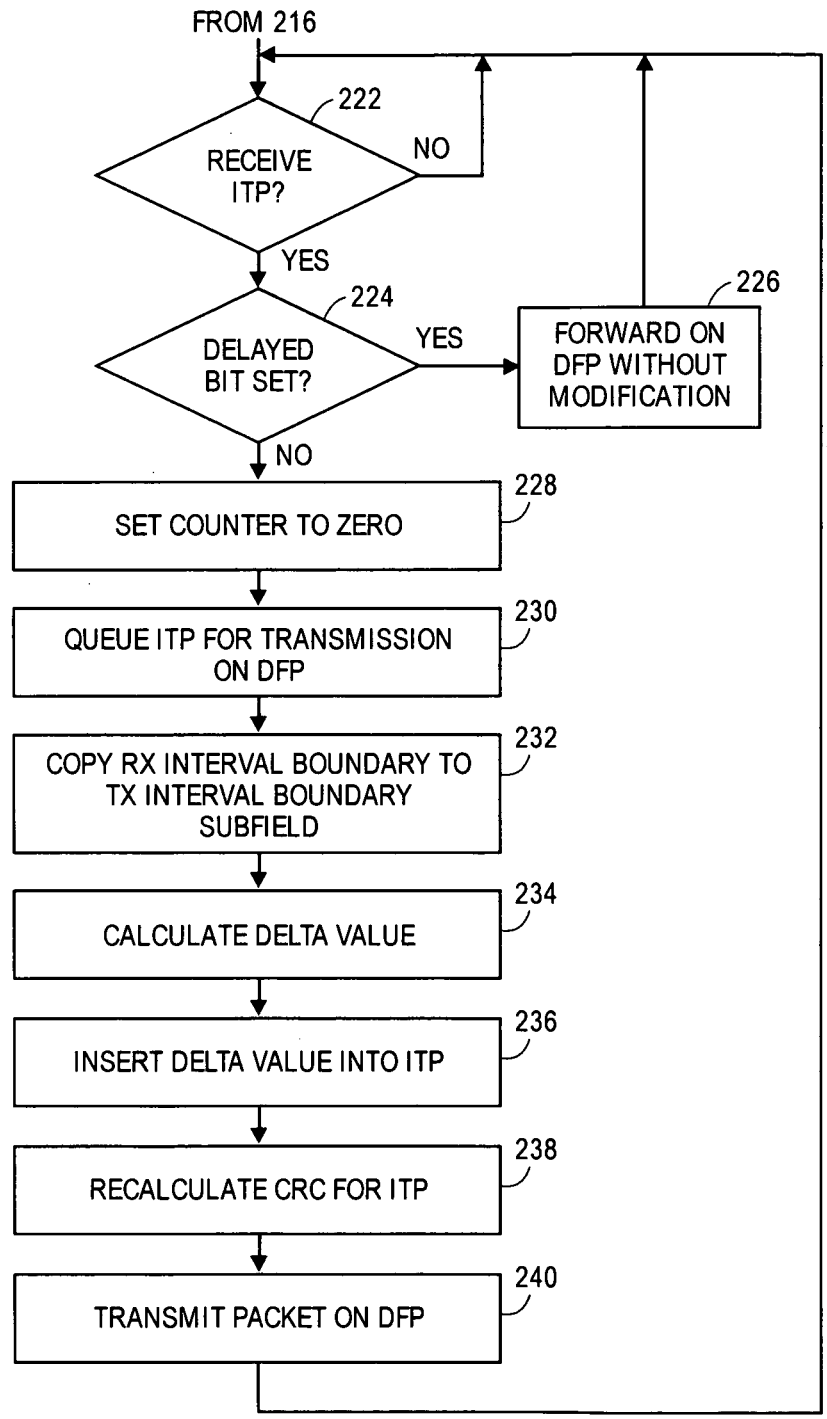

FIGS. 2A and 2B are a flowchart of operation in a retimer in one embodiment of the invention. In the retimers engaged in link delay management exchanges 200, the retimer transmits an LDM request on its upstream-facing port (UFP) at block 202 Concurrently with transmission, the retimer starts a timeout counter. At block 204, the retimer stores the timestamp indicative of the time at which transmission on the upstream port of the link delay management request began. This stored time may be referred to as $t_1$. At decision block 206, a determination is made if a response has been received on the upstream-facing port. If no response has been received, a determination is made whether at timeout has occurred at decision block 208. If a timeout has occurred, the system may reattempt a link delay management request at block 202. Otherwise, the system continues to wait for a response.

If a response is received, the time the response is received is noted at block 210. The time of receipt of a response may be referred to as $t_4$. At block 212, the timing information in the response is retrieved. Generally speaking, the timestamp field in the response will provide an indication of the difference between the time at which the request was received at the downstream-facing port ($t_2$) of the receiver and the time at which that receiver transmitted the response ($t_3$). Thus, four times are available: the time the original request was sent, the two times defining receipt of request and response (this may be given as either the time of receipt and the time of response, or merely a difference value, e.g. $t_3$−$t_2$), and the time at which the response was received by the retimer. By subtracting the time in the responder from the aggregate time from sending and receiving the response, and dividing by 2, a value for the link delay and the upstream link is obtained at block 214. That is, LD=(($t_4$−$t_1$)−($t_3$−$t_2$))/2. The value of the link delay in the upstream link is retained in the retimer for later use at block 216.

Concurrently with link delay management requests on the upstream facing port, the retimer may be responding to a link delay management request on its downstream-facing port (DFP). That is, at decision block 218, a determination is made whether a link delay management request has been received on the downstream-facing port. If no request has been received, no action is taken until a request is received. If a request is received, at block 220 the retimer transmits a response on its downstream facing port. Generally, the response will take the form of an LDM response packet, including, a response delay field to provide an indication of the time between when the request was received at the downstream-facing port and when the response was actually transmitted on the downstream-facing port. This allows downstream bus entities to correctly calculate delay in the link between the retimer and the requester.

Once link delay management exchanges have completed, in normal operation, at block 222, a determination is made if an ITP has been received. If an ITP has been received, a determination is made at block 224 whether the "delayed" bit in the ITP is set. If the delayed bit is set, at block 222, the ITP is forwarded on the downstream-facing port without modification at block 226. If the delayed bit is not set, the ITP delay counter in the retimer is set to zero at block 228. At block 230, the ITP is queued for retransmission on the downward-facing port. At block 232, the queued ITP is modified by copying a received interval boundary into the transmit interval boundary subfield of the queued ITP. That is, bus interval boundary$_{(RXITP)}$ is copied to bus interval boundary$_{(TXITP)}$ subfield of the isochronous timestamp field in the queued ITP.

At block 234, a Delta value is calculated for the queued ITP. The Delta value is equal to the LDM link delay (for the upstream port)+the Delta present in the received ITP field Delta$_{(RXITP)}$+the value of the ITP delay counter in the retimer−the correction value from the received packet; that is, correction$_{(RXITP)}$.

The value of the ITP used is the value when the packet will be transmitted, not the value when the packet is queued. If the calculated Delta is greater than or equal to 0, or less than 7500, the retimer inserts the Delta value in the Delta subfield Delta$_{(TXITP)}$ and sets the correction value in the packet to be transmitted to be 0. That is, correction$_{(TXITP)}$ is set to zero. If the Delta value calculated is greater than or equal to 7500, the retimer sets the Delta value equal to 7500 in the packet to be transmitted. If the Delta value calculated at the retimer sets the Delta$_{(TXITP)}$ to 0, it calculates the correction value of the negative of the Delta value and inserts that into the ITP packet. Thereafter, at block 238, the cyclic redundancy check values for the ITP are recalculated for the modified ITP. After modification, the packet is transmitted on the downstream-facing port 240, and the process continues. In some cases, an ITP may be received before the LDM exchange has occurred. In such cases, the retime will simply set the "delayed" bit in the ITP and forward it downstream.

Figure 3:
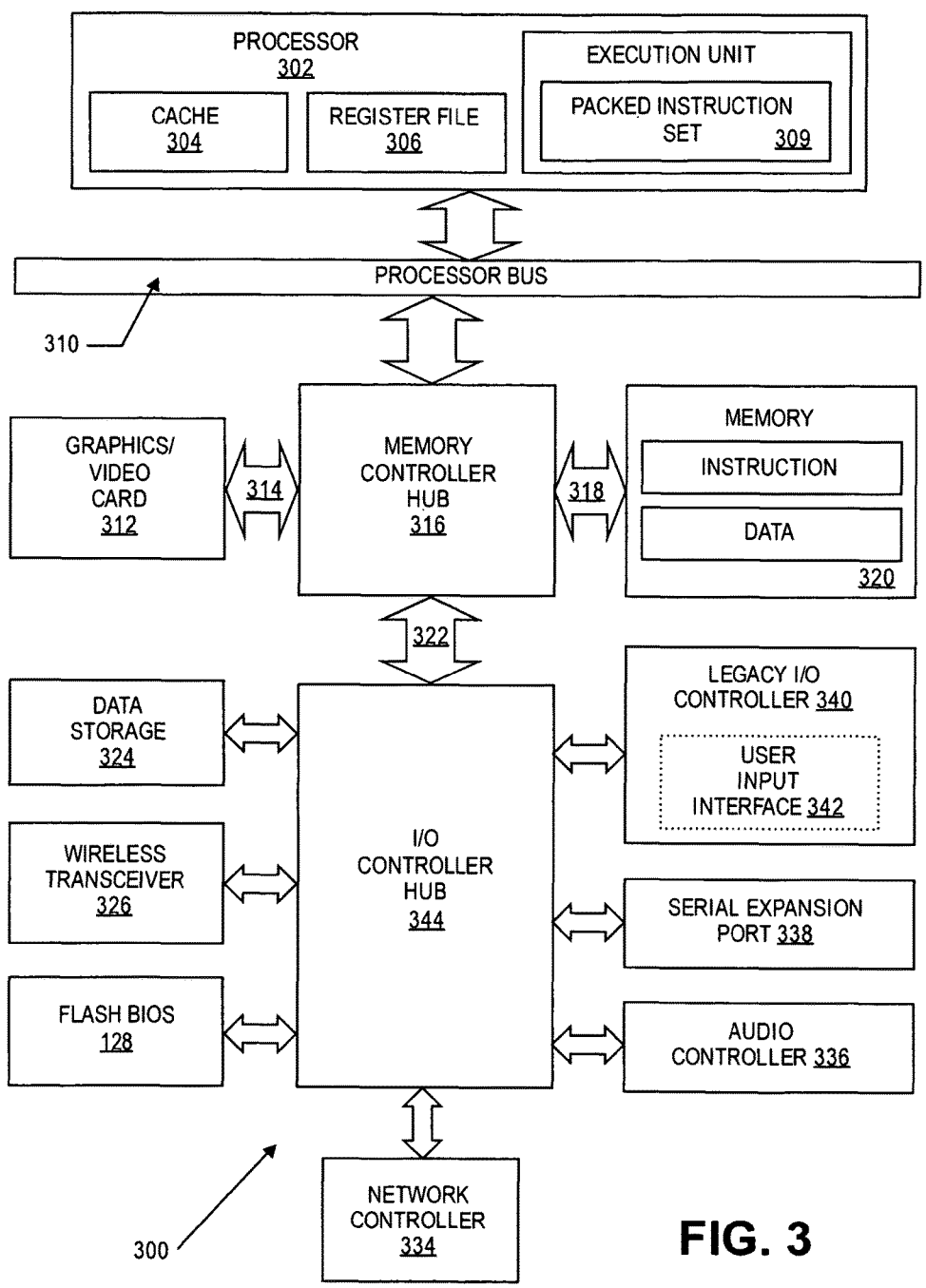
FIG. 3 is a block diagram of an exemplary computer system according to one embodiment of the invention.

Turning to FIG. 3, a block diagram of an exemplary computer system formed with a processor that includes execution units to execute an instruction, where one or more of the interconnects implement one or more features in accordance with one embodiment of the present invention is illustrated. System 300 includes a component, such as a processor 302, to employ execution units including logic to perform algorithms for process data, in accordance with the present invention, such as in the embodiment described herein. System 300 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 300 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 302 includes one or more execution units 308 to implement an algorithm that is to perform at least one instruction. One embodiment may be described in the context of a single processor desktop or server system, but alternative embodiments may be included in a multiprocessor system. System 300 is an example of a 'hub' system architecture. The computer system 300 includes a processor 302 to process data signals. The processor 302, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 302 is coupled to a processor bus 310 that transmits data signals between the processor 302 and other components in the system 300. The elements of system 300 (e.g., graphics accelerator 312, memory controller hub 316, memory 320, I/O controller hub 344, wireless transceiver 326, Flash BIOS 328, Network controller 334, Audio controller 336, Serial expansion port 338, I/O controller 340, etc.) perform their conventional functions that are well known to those familiar with the art.

In one embodiment, the processor 302 includes a Level 1 (L1) internal cache memory 304. Depending on the architecture, the processor 302 may have a single internal cache or multiple levels of internal caches. Other embodiments include a combination of both internal and external caches depending on the particular implementation and needs. Register file 306 is to store different types of data in various registers including integer registers, floating point registers, vector registers, banked registers, shadow registers, checkpoint registers, status registers, and instruction pointer register.

Execution unit 308, including logic to perform integer and floating point operations, also resides in the processor 302. The processor 302, in one embodiment, includes a microcode (ucode) ROM to store microcode, which, when executed, is to perform algorithms for certain macroinstructions or handle complex scenarios. Here, microcode is potentially updateable to handle logic bugs/fixes for processor 302. For one embodiment, execution unit 308 includes logic to handle a packed instruction set 309. By including the packed instruction set 309 in the instruction set of a general-purpose processor 302, along with associated circuitry to execute the instructions, the operations used by many multimedia applications may be performed using packed data in a general-purpose processor 302. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 308 may also be used in micro controllers, embedded processors, graphics devices, DSPs, and other types of logic circuits. System 300 includes a memory 320. Memory 320 includes a dynamic random access memory (DRAM) device, a static random access memory (SRAM) device, flash memory device, or other memory device. Memory 320 stores instructions and/or data represented by data signals that are to be executed by the processor 302.

Note that any of the aforementioned features or aspects of the invention may be utilized on one or more interconnects illustrated in FIG. 3. For example, an on-die interconnect (ODI), which is not shown, for coupling internal units of processor 302 implements one or more aspects of the invention described above. Or the invention is associated with a processor bus 310 (e.g., Intel Quick Path Interconnect (QPI) or other known high performance computing interconnect), a high bandwidth memory path 318 to memory 320, a point-to-point link to graphics accelerator 312 (e.g., a Peripheral Component Interconnect express (PCIe) compliant fabric), a controller hub interconnect 322, an I/O or other interconnect (e.g., USB, PCI, PCIe) for coupling the other illustrated components. Some examples of such components include the audio controller 336, firmware hub (flash BIOS) 328, wireless transceiver 326, data storage 324, legacy I/O controller 310 containing user input and keyboard interfaces 342, a serial expansion port 338 such as Universal Serial Bus (USB), and a network controller 334. The data storage device 324 can comprise a hard disk drive, a floppy disk drive, a CD-ROM device, a flash memory device, or other mass storage device.

The following examples pertain to further embodiments. The various features of the different embodiments may be variously combined with some features included and others excluded to suit a variety of different applications. Some embodiments pertain to a retimer for a universal serial bus with art upstream-facing port (UFP) and a downstream-facing port (DFP). The retimer includes logic to determine a link delay on an upstream link.

In further embodiments, the logic initiates a link delay management exchange on the upstream port.

In further embodiments, the logic sends a link management packet out the upstream-facing port.

In further embodiments, the retimer has logic to respond to a link delay management exchange received on the downstream-facing port.

In further embodiments, the logic to determine the link day includes a link delay management requestor state machine and a timeout counter.

In further embodiments, the retimer has timing adjustment logic to aggregate upstream link delay, transmission delay in the retimer, and retimer delay, and adjust a master clock timing information of an isochronous timestamp packet by the aggregate.

In further embodiments, the time adjustment logic includes an isochronous timestamp packet delay counter.

Some embodiments pertain to a universal serial bus (USB) system with a USB host, a USB device, and a retimer having an upstream-facing port directed towards the host and a downstream facing port directed toward the device, the retimer including logic to initiate a link delay management exchange on the upstream-facing port.

Further embodiments have a USB hub between the host and the retimer.

In further embodiments, the retimer has logic to respond directly to a link delay management request received on the downstream-facing port.

In further embodiments, the retimer is instantiated in a USB cable.

In further embodiments, the logic to initiate the link delay management exchange includes a state machine and a counter.

Some embodiments pertain to method of conducting precision time management in a universal serial bus system with a retimer. The method includes initiating, from the retimer, a link delay management request on an upstream-facing port of the retimer. The method further includes receiving, at a downstream-facing port of the retimer, a link delay management request and responding to the request received on the downstream-facing port.

In further embodiments, initiating includes transmitting a link delay management packet on the upstream-facing port and maintaining a record of a time the transmitting began.

In further embodiments, the method includes receiving a response link delay management packet on the upstream-facing port in response to the transmitting, calculating the link delay from the data in the response link delay management packet and maintaining a record of the upstream link delay in the retimer.

In further embodiments, responding includes transmitting a response link delay management packet on a downstream-facing port including timing information indicating a time interval between receipt of the request and the transmitting of the response.

In further embodiments, after the link delay management exchange completes, the method includes receiving an isochronous timestamp packet on the upstream-facing port of the retime and modifying, in the retimer, the isochronous timestamp packet based, at least in part, on an upstream link delay determined from the link delay management request. The modified packet is then transmitted on the downstream-facing port of the retimer.

In further embodiments, the method includes maintaining an isochronous timestamp packet delay counter and incrementing the counter responsive to a precision time management clock.

In further embodiments, the method includes verifying that a delayed bit is not set in the received isochronous timestamp packet and setting the counter to zero responsive to the verifying. The method also includes queuing the received ITP packet for transmission on the downstream-facing port of the retimer and using values at transmission time for the modifying.

In further embodiments, modifying includes copying a received bus interval boundary to a transmit bus interval boundary sub-field of an isochronous timestamp field of the isochronous timestamp packet. Modifying also includes calculating a delta value for a time the isochronous timestamp packet will be transmitted and inserting the delta value into a delta sub-field of the isochronous timestamp field.

In further embodiments, the delta value is given by the formula:

$$\Delta_{tx} = \text{link delay} + \Delta_{rx} + \text{ITP delay counter} - \text{correction}_{rx}.$$

In further embodiments, the method includes recalculating a cyclical redundancy check for the isochronous timestamp packet as modified.

In further embodiments, the method includes identifying that the delayed bit is set in the received isochronous timestamp packet and transmitting the received packet on the downstream port without modification.

While embodiments of the invention are discussed above in the context of flow diagrams reflecting a particular linear order, this is for convenience only. In some cases, various operations may be performed in a different order than shown or various operations may occur in parallel. It should also be recognized that some operations described with respect to one embodiment may be advantageously incorporated into another embodiment. Such incorporation is expressly contemplated.

In the foregoing specification, the invention has been described with reference to the specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A retimer for a universal serial bus comprising:
    an upstream-facing port (UFP);
    a downstream-facing port (DFP); and
    logic to determine a link delay on an upstream link; and
    timing adjustment logic to aggregate an upstream link delay, transmission delay in the retimer, and retimer delay and to adjust a master clock timing information of an isochronous timestamp packet by the aggregated delay.

2. The retimer of claim 1, wherein the logic initiates a link delay management exchange on the upstream port.

3. The retimer of claim 1, wherein the logic sends a link management packet out the upstream-facing port.

4. The retimer of claim 1, further comprising:
    logic to respond to a link delay management exchange received on the downstream-facing port.

5. The retimer of claim 1, wherein the logic to determine the link delay comprises:
    a link delay management requestor state machine; and
    a timeout counter.

6. A universal serial bus (USB) system comprising:
    a USB host to be coupled to a USB device;
    a retimer having an upstream-facing port directed towards the host and a downstream facing port directed toward the device, the retimer comprising logic to initiate a link delay management exchange on the upstream-facing port and timing adjustment logic to aggregate an upstream link delay, transmission delay in the retimer, and retimer delay and to adjust a master clock timing information of an isochronous timestamp packet by the aggregated delay.

7. The system of claim 6, wherein the retimer comprises: logic to respond directly to a link delay management request received on the downstream-facing port.

8. The system of claim 6, wherein the retimer is instantiated in a USB cable.

9. A method of conducting precision time management in a universal serial bus system with a retimer, the method comprising:
   initiating, from the retimer, a link delay management request on an upstream-facing port of the retimer;
   aggregating an upstream link delay, transmission delay in the retimer, and retimer delay;
   receiving, at a downstream-facing port of the retimer, a link delay management request based on the aggregated delay;
   responding to the request received on the downstream-facing port;
   receiving an isochronous timestamp packet on the upstream-facing port of the retimer; modifying, in the retimer, the isochronous timestamp packet based, at least in part, on an upstream link delay determined from the link delay management request; and
   transmitting the isochronous timestamp packet as modified on the downstream-facing port of the retimer.

10. The method of claim 9, wherein initiating comprises:
    transmitting a link delay management packet on the upstream-facing port;
    and maintaining a record of a time the transmitting began.

11. The method of claim 10, further comprising:
    receiving a response link delay management packet on the upstream-facing port in response to the transmitting;
        calculating an upstream link delay from data in the response link delay management packet; and
        maintaining a record of the upstream link delay in the retimer.

12. The method of claim 9, wherein responding comprises:
    transmitting a response link delay management packet on a downstream-facing port, the response link delay management packet comprising timing information indicating a time interval between receipt of the request and the transmitting of the response.

13. The method of claim 9, further comprising: maintaining an isochronous timestamp packet delay counter; and incrementing the counter responsive to a precision time management clock.

14. The method of claim 13, further comprising:
    verifying that a delayed bit is not set in the received isochronous timestamp packet;
    setting the counter to zero responsive to the verifying;
    queuing the received isochronous timestamp packet for transmission on the downstream-facing port of the retimer; and
    using values at transmission time for the modifying.

15. The method of claim 9, wherein modifying comprises: copying a received bus interval boundary to a transmit bus interval boundary sub-field of an isochronous timestamp field of the isochronous timestamp packet; calculating a delta value for a time the isochronous timestamp packet will be transmitted; and inserting the delta value into a delta sub-field of the isochronous timestamp field.

16. The method of claim 15, wherein the delta value is given by the formula:

$$\Delta tx = \text{link delay} + \Delta rx + \text{ITP delay counter} - \text{correction}_{rxX}.$$

17. The method of claim 9, further comprising:
    recalculating a cyclical redundancy check for the isochronous timestamp packet as modified.

18. The method of claim 9, further comprising:
    identifying a delayed bit is set in the received isochronous timestamp packet; and
    transmitting the received packet on the downstream facing port without modification.

* * * * *